United States Patent [19]

Matsumura et al.

[11] 4,336,989
[45] Jun. 29, 1982

[54] FOCUSING SCREEN

[75] Inventors: Susumu Matsumura, Kawasaki; Takashi Suzuki, Yokohama, both of Japan

[73] Assignee: Canon Kabushiki Kaisha, Tokyo, Japan

[21] Appl. No.: 209,491

[22] Filed: Nov. 24, 1980

[30] Foreign Application Priority Data

Nov. 29, 1979 [JP] Japan .............................. 54-154727
Nov. 29, 1979 [JP] Japan .............................. 54-154728

[51] Int. Cl.$^3$ .............................................. G03B 13/24
[52] U.S. Cl. .................................. 354/200; 354/166; 354/219
[58] Field of Search .............. 354/166, 219, 224, 225, 354/199, 200, 201; 356/8

[56] References Cited

U.S. PATENT DOCUMENTS 3,618,498 11/1971 Eppinger ............................ 354/166
4,171,890 10/1979 Mizuki et al. ....................... 354/166

FOREIGN PATENT DOCUMENTS

907245 3/1954 Fed. Rep. of Germany ...... 354/219
55-9568 1/1980 Japan ................................ 354/200

Primary Examiner—Russell E. Adams
Attorney, Agent, or Firm—Fitzpatrick, Cella, Harper & Scinto

[57] ABSTRACT

This specification discloses a focusing screen adapted to be mounted in the range finder of a single lens reflex camera. A diffraction lattice is provided in the focus indicating part of the focusing screen. The diffraction lattice comprises a periodical arrangement of optically asymmetric unit structures in which +1st diffracted light and −1st diffracted light assume a color-complementing relation, and in the defocus (out of focus) condition, double images colored in two colors mutually having a color-complementing relation are produced. Further, this diffraction lattice structure is such that the period directions are opposite to each other in the upper and lower half areas of the focus indicating part and therefore, the manner of coloring is inversely symmetric in the upper and lower areas and color split occurs even at the bondary between these areas. These phenomena disappear when the focus condition is brought about.

8 Claims, 15 Drawing Figures

FOCUSING SCREEN

BACKGROUND OF THE INVENTION

1. Field of the Invention

This invention relates to a focusing screen adapted to be mounted in the optical viewing path of an optical device.

2. Description of the Prior Art

Cameras of the single lens reflex type and also of the range finder type generally include a focus indicating system utilizing an image splitting bi-prism. In this focus indicating systems, a focusing screen having an image splitting bi-prism in the center of it is arranged in a plane in coincidence with a plane in the range finder in which a real image of the object to be photographed is formed. On this focusing screen, each half of the image in the finder is displaced in the defocus (out of focus) condition, and it is only when the image lies in the proper plane of the focusing screen that the two halves of the image do not appear to have any relative displacement. The two halves of the image in the focus condition remain colored in the color inherent to the image.

On the other hand, a cinecamera provided with a focus indicating system of the double image coincidence type is disclosed in U.S. Pat. No. 3,618,498. In this focus indicating system, a dichroic mirror is disposed within the photographic lens system so that double images mutually complementary in color are produced in the defocus condition. However, a focus indicating system of the colored image type using no dichroic mirror and applicable to a single lens reflex camera does not yet exist.

Japanese Pat. Nos. 9474/1955 and 12817/1979 disclose focusing screens of the double image coincidence type utilizing a diffraction lattice. It is described in these Japanese patents that in a view finder having such a focusing screen disposed therein, the double images viewed in the defocus condition are colored by the dispersion of the diffraction lattice. However, the coloring by this dispersion occurs only incidentally in the marginal portion of each image during the separation of the double images and the whole of each image is not colored and therefore, this coloring hardly contributes to the enhancement of the accuracy and ease of the focus detection.

SUMMARY OF THE INVENTION

It is a primary object of the present invention to provide a focusing screen of the multi-image coincidence type provided with a diffraction lattice and having high focusing accuracy.

It is another object of the present invention to provide an improved focusing screen in which each of multiple images is colored in a different color in the defocus condition and in which the multiple images are coincident and the coloring disappears in the focus condition.

It is still another object of the present invention to provide a focusing screen in which each of multiple images is colored in a different color in the defocus condition and the manner of coloring differs between two areas on the screen and in which in the focus condition, the multiple images are coincident and the coloring disappears.

It is yet another object of the present invention to provide a focusing screen in which multiple images are viewed in the defocus condition and the whole of each image is viewed as being substantially uniformly colored in a different color and which is suited for use with a single lens reflux camera.

To achieve these objects, the focusing screen according to an embodiment of the present invention has a diffraction lattice structure in which optically asymmetric structures are periodically formed.

In another embodiment, the focus indicating part of the focusing screen is divided into a plurality of areas and diffraction lattice structures in which novel, optically asymmetric structures for producing colored double images in the respective areas are periodically arranged are provided so that the directions of the period thereof differ from each other.

The invention will become more fully apparent from the following detailed description thereof taken in conjunction with the accompanying drawings.

DESCRIPTION OF THE PREFERRED EMBODIMENTS

Figure 1:
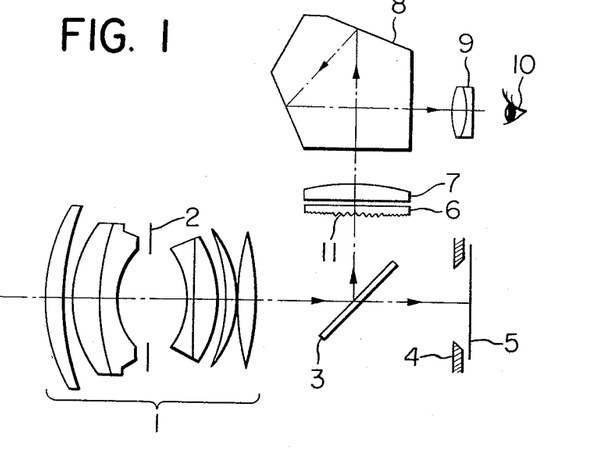
FIG. 1 is a cross-sectional view of a single lens reflex camera in which the focusing screen of the present invention is installed.

Referring to FIG. 1 which is a schematic cross-sectional view of a single lens reflex camera to which the focusing screen of the present invention is applied, it includes a phototaking lens 1, a diaphragm 2, a quick return mirror 3, a light-intercepting frame 4, a photographic film 5, a focusing screen 6, a condenser lens 7, a pentaprism 8 and an eye-piece 9 associated with the eye 10 of the viewer. Designated by 6 is the focusing screen of the present invention. Although the details of the construction of the focusing screen are not shown, in the center thereof, a range finding diffraction lattice structure 11 is provided substantially in coincidence with a plane equivalent to the surface of the photographic film 5.

Figure 2:
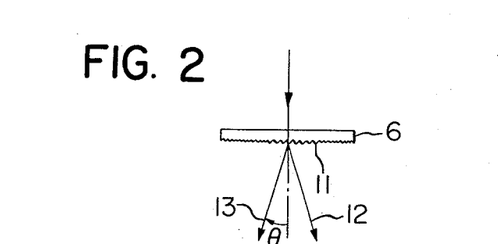
FIG. 2 illustrates the diffracting action of the focusing screen of the present invention.

FIG. 2 illustrates the diffracting action of the diffraction lattice structure provided on the focusing screen 6.

Figure 3:
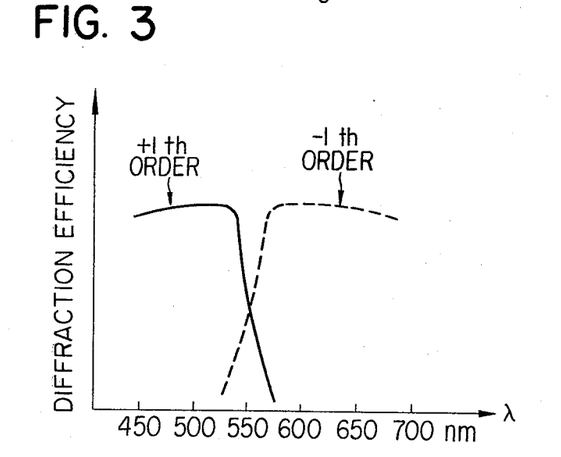
FIG. 3 illustrates the diffraction efficiency of the focusing screen as shown in FIG. 2.

The diffraction lattice structure 11 on the focusing screen 6 diffracts most of the incident light into +1st order diffracted light 12 and −1st order diffracted light 13 and, for example, diffracts most of the blue light into +1st order diffracted light and most of the red light into −1st order diffracted light. In the diffracting action of such diffraction lattice structure 11, the variation in the ±1st order diffraction efficiency for the wavelength of the incident light is shown in FIG. 3. As shown in FIG. 3, there is such a waveform dependency which is in a color-complementing relation with the ±1st order diffraction efficiency of the diffraction lattice structure 11. It is desirable that the +1st order diffraction efficiency and the −1st order diffraction efficiency, when they are added to each other, be constant over the entire wavelength.

Figure 4:
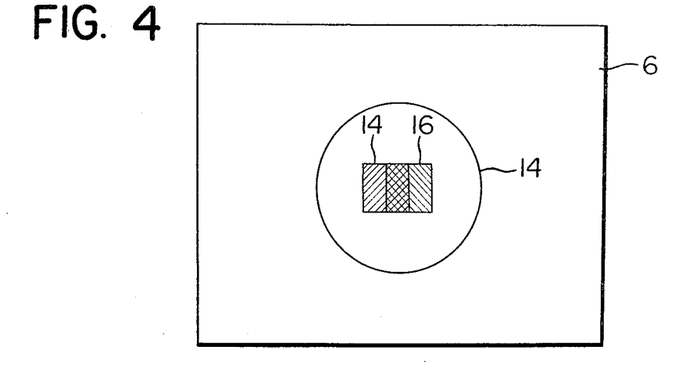
FIG. 4 shows the image of an object as viewed by the use of the focusing screen of FIG. 2.

When a focusing screen having such a diffraction lattice structure as the focus indicating part is used, the blurred image (multiple images) viewed during the defocus condition is such as shown in FIG. 4.

FIG. 4 is an enlarged view only of the interior of the focus indicating part 14 when a white square object, for example, a sheet of white paper attached to a wall, has been viewed from the eye-piece portion during the defocus condition.

In FIG. 4, reference numeral 14 designates the focus indicating part having a diffraction structure and there is seen an image 15 by the +1st order diffracted light and an image 16 by the −1st order diffracted light. The image 15 looks colored in blue and the image 16 looks colored in orange, and the portion in which the two images overlap looks naturally white. As the image plane comes near the focusing screen, the images 15 and 16 come near each other and, when focus condition has been brought about, the two images become completely coincident and an object image of inherent color is seen.

At this time, if the periodic construction of the diffraction lattice structure is rough, it will catch the eye and this is harmful to the focus detection and therefore, it is desirable that this periodic construction be finer than the resolution of the naked eye. The resolution of the naked eye varies depending on the performance of the finder optical system of the camera, but usually it is of the order of 10 μm and therefore, if the pitch of the lattice is made less than that, it will not catch the eye.

The focusing screen of a first embodiment of the present invention which is provided with a diffraction lattice having the above-described characteristic will be shown below.

Figure 5:
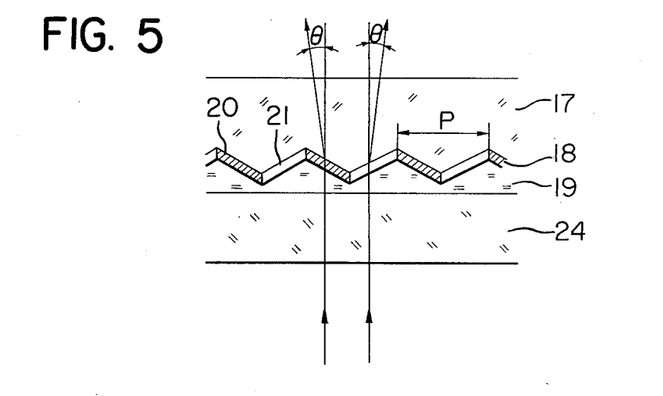
FIG. 5 is a cross-sectional view of the focusing screen according to a first embodiment of the present invention.

FIG. 5 is a cross-sectional view of the focus indicating part of that focusing screen. In FIG. 5, reference numeral 17 designates a transparent base having a relief diffraction lattice on a surface substantially coincident with the image plane, reference numeral 18 denotes a color filter, reference numeral 19 designates an adhesive layer having a refractive index different from that of the base 17, and reference numeral 24 denotes an optical transparent member as a cover. The color filter is provided directly on this relief structure as by coloring matter evaporation or dyed photoresist. A phase diffraction lattice structure is formed by the concavo-convexity of the relief structure on the base, and it gives a phase distribution to the incident light and creates a diffracting action.

Figure 6:
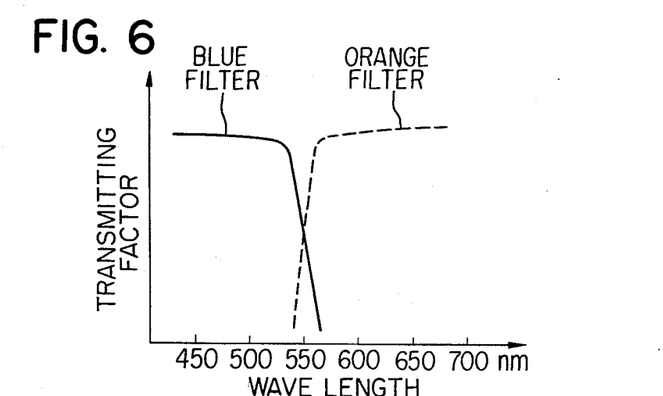
FIG. 6 illustrates the transmissivity of the color filter in FIG. 5.

This color filter comprises orange filter portions 20 and blue filter portions 21 arranged in the form of stripes and alternately with the same period as the relief diffraction lattice structure. This color filter has the transmitting factor shown in FIG. 6.

Accordingly, the light ray 22 of the light beam impinging on the focusing screen which is parallel to the optical axis has its red wavelength portion absorbed when it passes through the blue filter, whereafter only the blue light is diffracted by the relief structure 17 and exits in a direction $\theta$ with respect to the optical axis. Likewise, another light ray 23 passes through the orange filter, whereafter it is diffracted and exits in direction $-\theta$ with respect to the optical axis. A diffraction lattice structure comprising a combination of a relief structure and a color filter causes ±1st order diffracted lights to exit substantially in the same quantity of light. The stripe filter used in the present embodiment may be either a dichroic filter consisting of a multilayer dielectric film or a color absorbing filter utilizing a coloring matter.

Thus, the diffraction lattice structure of the present embodiment is an optically asymmetric phase diffraction lattice structure whose one period comprises a combination of a unit structure of geometrically symmetric relief structures for diffracting the incident light on the optical axis in two symmetric directions and a color filter in which color filters 20 and 21 having different wavelength characteristics within one period are arranged asymmetrically with respect to the axis of symmetry of the relief structures, whereby it produces double images colored substantially uniformly in different colors.

Accordingly, in the defocus condition, colored double images are viewed the range finder and, in the focus condition, a single image of inherent color is viewed through the range finder.

Figure 7:
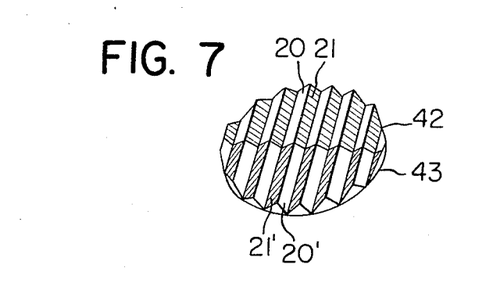
FIG. 7 is a perspective view of the focus indicating part of the focusing screen according to a second embodiment of the present invention.

FIG. 7 shows another embodiment of the focusing screen to which the phase diffraction lattice of FIG. 5 is applied.

Figure 15:
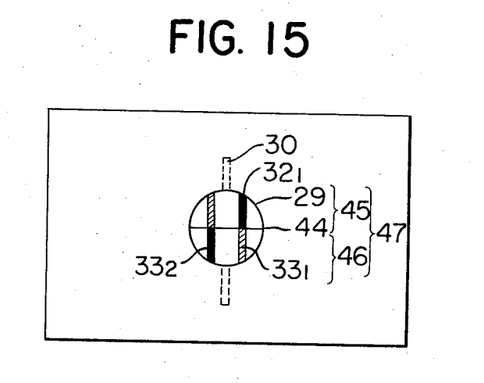
FIG. 15 shows the image of an object on the focus indicating part of FIGS. 7 and 14 in the defocus condition.

This embodiment is one in which the color filters in the diffraction lattice structure as shown in FIG. 5 are arranged with the color stripes thereof deviated by one-half pitch in both the upper area 42 and the lower area 43 of the focus indicating part. Accordingly, the phase diffraction lattices in the upper and lower areas are oriented oppositely to each other in optical asymmetry, and in the defocus condition, colored double images are viewed on each area of the focus indicating part and an image split in color is viewed at the boundary between the two areas because the manner of coloring in the upper area is reverse to that in the lower area. This condition is shown in FIG. 15.

Figure 8:
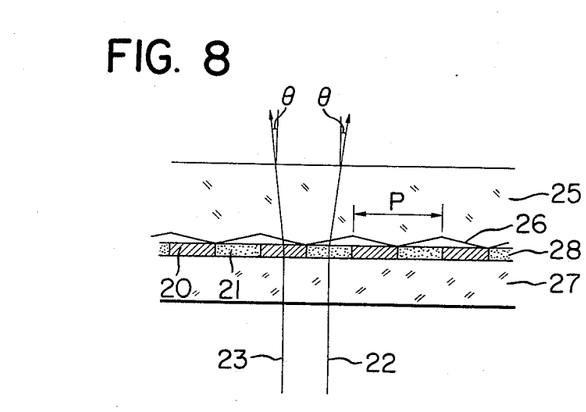
FIG. 8 is a cross-sectional view of the focusing screen according to a third embodiment of the present invention.

FIG. 8 shows a cross-section of a focusing screen using a phase diffraction lattice structure different in construction from that of FIG. 5. In FIG. 8, reference numeral 25 designates a base of period P less than the order of 10 μm having a mountain-shaped relief structure 26 on the surface thereof, and reference numeral 27 denotes a glass base having a color stripe filter 28 on the surface thereof. The base 25 is provided over and in proximity with the base 27. The color stripe filter comprises orange filter portions 20 and blue filter portions 21 alternately arranged with the same period as the diffraction lattice. As in the previous embodiment, this color filter has the transmitting factor shown in FIG. 6.

Description will now be made of an embodiment of the focusing screen which, unlike the hitherto described embodiments, requires no color filter but forms colored double images during the defocus condition.

Figure 9:
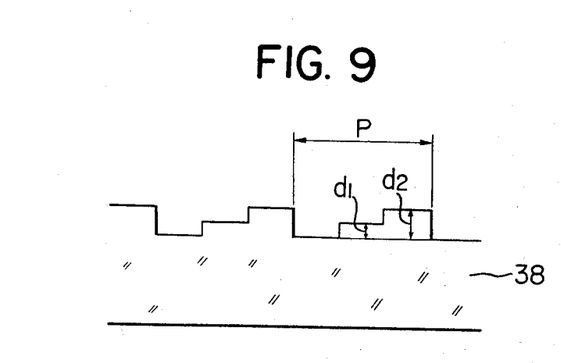
FIG. 9 is a cross-sectional view of the focusing screen according to a fourth embodiment of the present invention.

FIG. 9 is a cross-sectional view of a diffraction lattice structure portion provided on such a focusing screen. In FIG. 9, reference numeral 38 designates a base formed with a diffraction lattice in which three flat portions each having a width of ⅓ of the period are respectively provided with step differences $d_1$ and $d_2$ so that three steps of flat portions are provided in one pitch. The diffraction lattice of such shape is shown as a color resolving filter in the article "Color Separation Grating" contained in *Applied Optics* 17 (15), 2273, 1978. By selecting, for such diffraction lattice, the step differences $d_1$ and $d_2$ thereof to the values of the preferred design example to be described in detail, it is possible to cause the +1st order diffracted light to have the wavelength characteristic of blue light and cause the −1st order diffracted light to have the wavelength characteristic of red light. A design example of the form suited for producing colored double images by a phase diffraction lattice of such construction will be shown below. As shown in FIG. 9, the step differences are $d_1$ and $d_2$ with the first step as the reference. The refractive index of the optical transparent member forming this diffraction lattice is 1.5. A graph in which the 0-order and the ±1st order diffraction efficiency when $d_1=0.67$ μm and $d_2=2.24$ μm have been calculated while varying the wavelength of the incident light is shown in FIG. 10.

Figure 10:
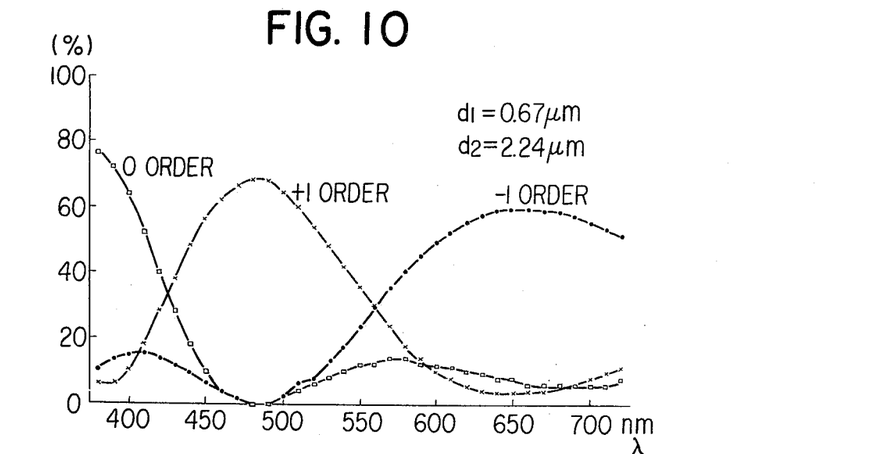
FIGS. 10, 11, 12 and 13 are graphs illustrating the diffraction efficiencies for the four design examples of the focusing screen shown in FIG. 9.

As seen from FIG. 10, the +1st order diffracted light has much of the blue light component and the −1st order diffracted light has much of the red light component. Also, the 0-order diffraction efficiency which forms an impediment during the detection of the focus is not zero, whereas in the visible range, it is small as compared with the +1st order and the −1st order diffraction efficiency and therefore, it does not form so great an impediment.

Figure 11:
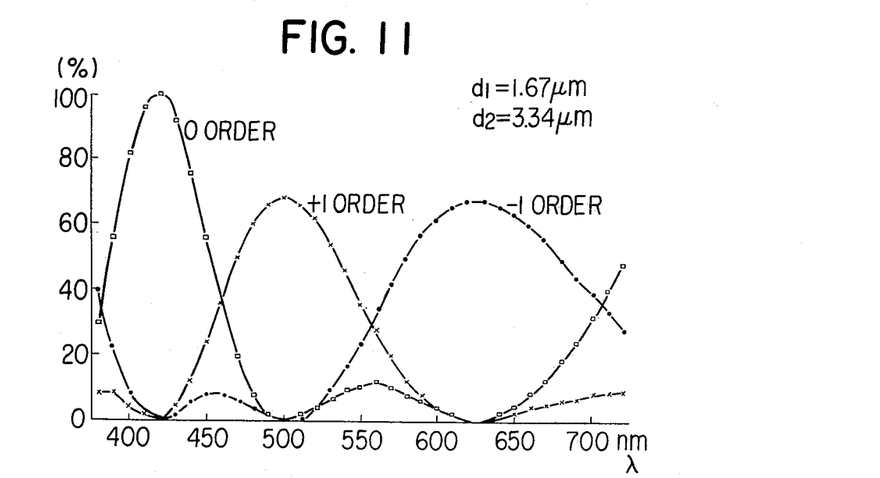

Again in the case of a three-step type diffraction lattice, the form effective for the present invention is not restricted to the above-described example, but other forms will also be effective for the purpose of the present invention if the diffraction lattice is designed with the width of each concavo-convexity or each step difference as a parameter. As an example of another form, the calculated values of diffraction efficiencies when $d_1=1.67$ μm and $d_2=3.34$ μm are shown in FIG. 11. This characteristic is also substantially similar to that of FIG. 10 and is effective for the purpose of the present invention.

While FIGS. 10 and 11 show design examples of the three-step type diffraction lattice in which mainly the +1st order diffracted lights are produced, the diffraction lattice may also be designed such that mainly the 0-order and the +1st order diffracted light or the 0-order and the −1st order diffracted light are produced and assume a color-complementing relation with each other.

Figure 12:
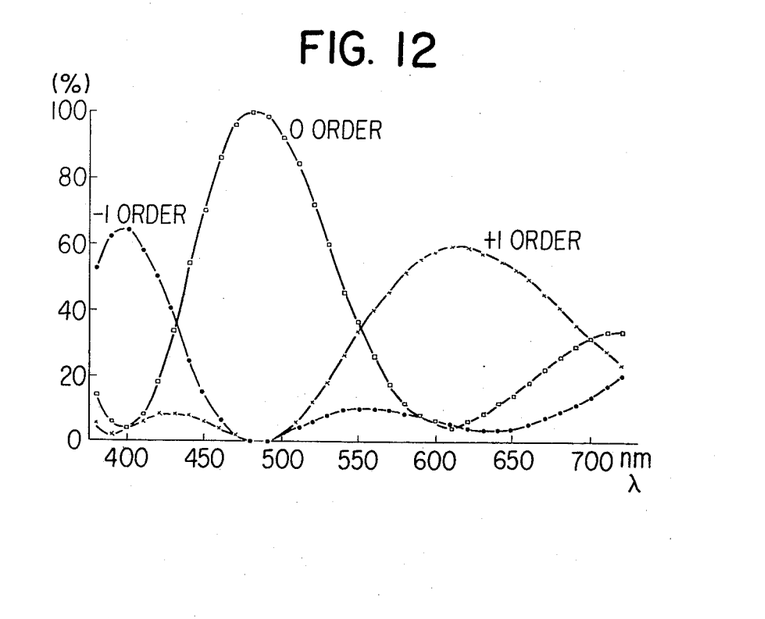
Figure 13:
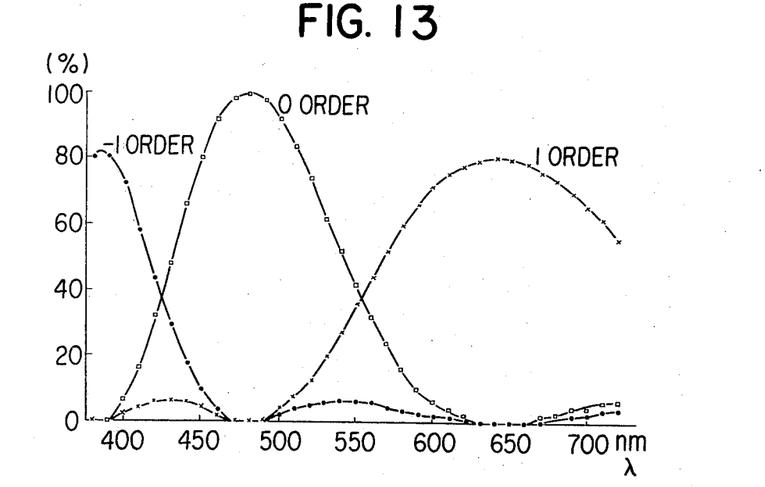

FIG. 12 shows the calculated value of each diffraction efficiency when $d_1=1.92$ μm and $d_2=2.9$ μm. In a four-step type diffraction lattice having four flat portions in one pitch, if $d_1=0.96$ μm, $d_2=1.92$ μm and $d_3=2.88$ μm, there will be obtained the diffraction efficiencies as shown in FIG. 13.

The diffraction lattice structure of the present embodiment, unlike the previous embodiment, does not have a color filter for imparting optical asymmetry to the relief structure for diffraction while, on the other hand, it produces colored double images due to geometrical asymmetry.

Figure 14:
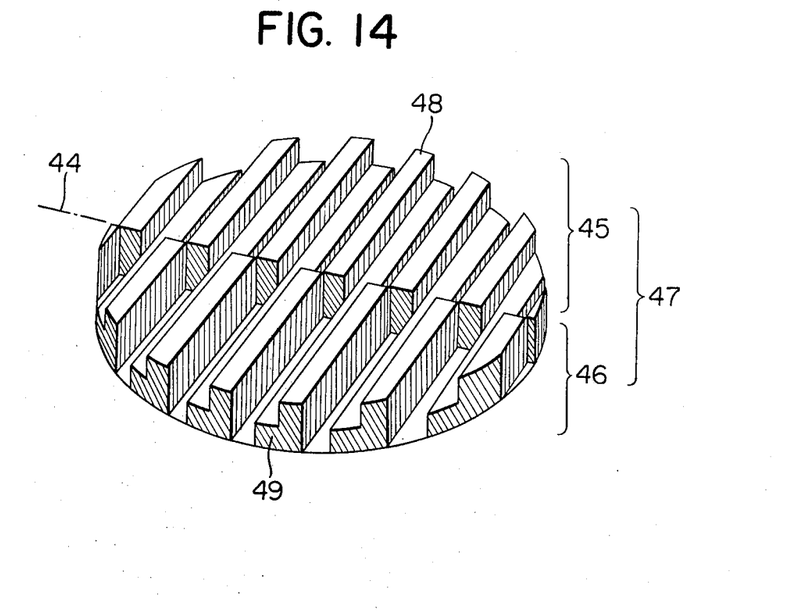
FIG. 14 is a perspective view of the focus indicating part of the focusing screen according to a fifth embodiment of the present invention using the diffraction lattice structure shown in FIG. 9.

FIG. 14 shows a focusing screen in which, like the focusing screen of FIG. 7, the diffraction lattice structure shown in FIG. 9 has the period directions thereof oppositely oriented in each of the two areas of the focus indicating part. FIG. 14 is a perspective view of the focus indicating part of this focusing screen. The focus indicating part 47 is divided into two areas 45 and 46 with the borderline 44 as the boundary, and in the respective areas, there are formed mutually congruent relief type phase diffraction lattices 48 and 49 having period directions different by 180°. Both of this focus indicating part and the focus indicating part of FIG. 7 impart substantially the same action to the image in the defocus condition, and the object image as it is viewed by the use of the focus indicating part during the focusing is shown in FIG. 15. In FIG. 15, reference numeral 29 designates the range of the focus indicating part and reference numeral 44 designates the borderline between the areas 45 and 46. In FIG. 15, a white bar-like object 30 is viewed in its defocus condition and in each area with the borderline 44 as the boundary, the object is separated into red and blue double images. Double images uniformly colored in respective different colors, such as the red image $32_1$ and blue image $32_2$ in the upper half area 45 and the red image $33_2$ and blue image $33_1$ in the lower half area 46 are viewed, and as the focus condition is brought about, these colored double images disappear and are not at all viewed in the focus condition, thus facilitating the focusing and enhancing the accuracy of the focusing. In addition to the effect described just above, these focus indicating parts provide an effect that in the focus indicating part within the view field, the directions of color deviation are opposite to each other in the upper and the lower half area and for example, like the red image $32_1$ to the blue image $33_1$, a continuous image causes color split with the borderline 44 as the boundary to provide an action like that of the conventional split image prism, thereby simplifying the discrimination of the defocus condition and greatly enhancing the ease and accuracy of the focusing. Further, generally, in the double image coincidence system using colored double images which utilizes a dichroic mirror, where the object to be photographed is of a single color such as red, the image corresponding to blue disappears and only a single image appears to make the focus indicating impossible, whereas in the present embodiment, the blue images $32_1$ and $32_2$ remain to enable the focus indicating by a colored split image. In the embodiments so far shown, the focus indicating part has been divided into two areas and the period directions have been made opposite to each other as the most preferable example, whereas the present invention is not restricted thereto to obtain the same effect as that described above.

Thus, the diffraction lattice structure used in the present embodiment comprises optically asymmetric structures arranged periodically, whereby it can produce colored double images and further, the period directions thereof are made opposite to each other in two areas, whereby by utilization of the asymmetry thereof, a color split image may be produced to obtain the great effect as already described.

Also, to make the phase type diffraction lattice structure of the shape as shown in FIGS. 9 and 14, use may be made of the photoetching technique using an optical mask and photoresist as used in the manufacture of semiconductor electronic elements. Further, if a master metal mold is made by the electroforming technique with the thus obtained diffraction lattice as a negative, the concavo-convex structure of this master metal mold may be transferred to plastic members to thereby mass-produce copies at a low cost.

As described above, the focusing screen according to an embodiment of the present invention has in the focus indicating part a diffraction lattice structure comprising optically asymmetric structures periodically formed with respect to the light ray on optical axis, whereby it has the action of causing different wavelength components of a white incident light beam to be separated by diffracting action into directions substantially symmetric with respect to the optic axis and therefore, during the defocus condition, double images substantially uniformly colored in different colors may be viewed and, during the focus condition, the double images are coincident and the coloring disappears, thus facilitating the focusing and enabling the focus indicating of high accuracy.

The focusing screen according to another embodiment of the present invention uses, as the diffraction lattice structure used in the focus indicating part, a diffraction lattice structure comprising periodically formed, optically asymmetric structures for causing different wavelength components to be separated into different directions with respect to an incident light beam, whereby during the defocus condition, colored double images are formed, and the focus indicating part is divided into a plurality of areas so that the period directions of the diffraction lattice structure in said areas are made different from each other, whereby color splits are produced with the borderline between said areas as the boundary and during the defocus condition, they may be viewed simultaneously and during the focus condition, they disappear, thus facilitating and enabling the focus indicating of high accuracy.

The present invention is not restricted to still single lens reflex cameras, but is also effective in cinecameras. However, in the case of cinecameras, the finger magnification is great and therefore, the period of the diffraction structure must the finer than in the case of still single lens reflux cameras.

What we claim is:

1. In a coincidence type range finder system having an objective lens for forming an image in a primary image plane, a focusing screen for indicating the focus condition of the image comprising:
  a light diffracting means comprising a plurality of optically asymmetric unit structures periodically arranged substantially in said plane, said light diffracting means diffracting light components of different wavelengths of the incident light beam from said objective lens in different directions, whereby when said objective lens does not form the image on said plane, a plurality of images colored in different colors are viewed in the range finder.

2. A focusing screen according to claim 1, wherein said diffracted wavelength components are wavelength components mutually in color-complementing relation which are diffracted mainly as $+n$ order diffracted light and $-n$ order diffracted light, where n is 1 or a greater integer.

3. A focusing screen according to claim 1, further comprising another light diffracting means which is the same in construction as said light diffracting means and lies substantially in said plane like said light diffracting means, but in which the arrangement direction of the plurality of unit structures is different from that of said light diffracting means.

4. A focusing screen according to claim 3, wherein said light diffracting means and said another light diffracting means are provided in two areas of equal size in said plane delimited by a line perpendicular to the optical axis of said range finder system, and the periodic arrangement directions thereof are opposite to each other.

5. A focusing screen according to claim 1, 3 or 4, wherein each of said optically asymmetric unit structures is a staircase-like structure comprising three or more flat portions successively arranged with step differences therebetween.

6. A focusing screen according to claim 1, 3 or 4, wherein each of said optically asymmetric unit structures comprises a combination of a unit structure of optically symmetric relief type diffraction lattice and a unit structure of color stripe filter consisting of a plurality of filter portions of different wavelength characteristics periodically arranged.

7. In a single lens reflex camera having an objective lens for forming an image in a primary image plane of the view finder, a focusing screen comprising:
  a first light diffracting means comprising a plurality of optically asymmetric unit structures periodically arranged substantially in said plane, said first light diffracting means diffracting components of different wavelengths of the incident light beam from said objective lens in different directions; and
  a second light diffracting means similar in construction to said first light diffracting means;
  said first and second light diffracting means being provided in two equally divided areas delimited by a line perpendicular to the optical axis of said view finder, with the arrangement directions of the unit structures thereof being made opposite to each other.

8. A focusing screen according to claim 7, wherein each of said optically asymmetric unit structures of said first and second light diffracting means is a staircase-like structure comprising three or more flat portions successively arranged with step differences therebetween.

* * * * *

UNITED STATES PATENT OFFICE
CERTIFICATE OF CORRECTION

Patent No. 4,336,989         Dated June 29, 1982

Inventor(s) SUSUMU MATSUMURA, ET AL.

It is certified that error appears in the above-identified patent and that said Letters Patent are hereby corrected as shown below:

Column 1, line 13, change "systems" to --system--.

Column 1, line 22, change "focus" to --defocus--.

Column 7, line 43, change "finger" to --finder--.

Column 7, line 46, change "reflux" to --reflex--.

Signed and Sealed this

Seventh Day of December 1982

[SEAL]

Attest:

GERALD J. MOSSINGHOFF

Attesting Officer      Commissioner of Patents and Trademarks